Patented July 26, 1927.

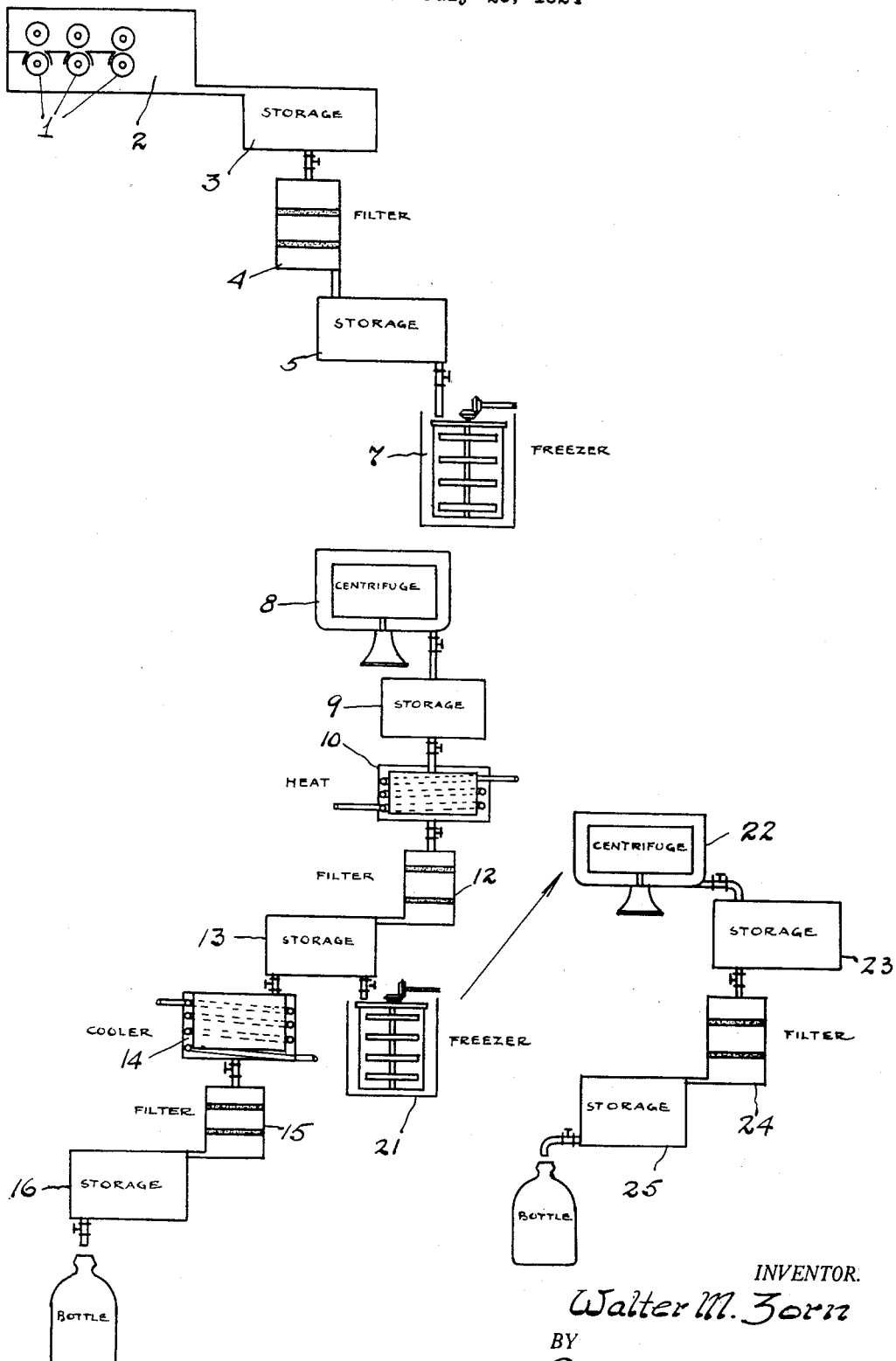

1,636,890

UNITED STATES PATENT OFFICE.

WALTER M. ZORN, OF EAST CLEVELAND, OHIO.

METHOD OF MAKING CONCENTRATED FRUIT JUICE.

Application filed July 25, 1924. Serial No. 728,111.

The present invention relates to a method of making a concentrated solution of fruit or vegetable juices and more particularly to a method of preparing such a concentrate as will keep indefinitely without the necessity of cooking or adding sugar or other ingredients.

Essentially the method consists in extracting the juices by squeezing preferably without the addition of water, and then filtering to remove the foreign matter such as pulp, seed and the like and such other suspended matter as may be removed.

The filtered juice must be so treated as to remove the undesirable elements and leave only those desirable elements. This is accomplished by freezing the liquid into a water ice or snow and then removing the snow or ice crystals to remove the water content in the original liquid. The concentration by the freezing method may be accomplished in one step or by several steps. Such matter as is thrown into suspension by the removal of the water and by the drop in temperature must be filtered out and the filtration must be done at the desired low temperature to prevent matter from going back into solution.

Other undesirable matter is also present even in the concentrate and this matter consists largely of pectin, its derivatives and albuminous material. To remove this matter, the liquid must be heated at some state to throw such matter into suspension or to coagulate the same. Thus the method consists of pressing the fruit or vegetable to extract the juices, filtering the juice at a low temperature just above the freezing point, filtering the juice at a relatively high temperature preferably at the usual sterilizing temperature, concentrating the juice by removal of the water by a freezing method.

The resultant filtered concentrated juice may be bottled and used as a flavoring extract or the like or may be diluted for beverage or other purpose.

To the accomplishment of the foregoing and related ends, said invention, then, consists of the means hereinafter fully described and particularly pointed out in the claims.

The annexed drawing and the following description set forth in detail approved methods of carrying out the invention, such disclosed modes, however, constituting but two of the various ways in which the principle of the invention may be used.

In said annexed drawing:—

The single figure is a diagrammatic layout of apparatus suitable for carrying out the described process.

As illustrated in the drawing, the fruit, such as oranges or the like, is first passed through a series of rollers 1 which are mounted in any suitable vat or tank 2 for collecting the liquid, and the juices are squeezed out and allowed to drain from the vat into a storage tank or other receptacle 3. From this storage tank, or, if preferred, direct from the squeezing machine, the liquid is drawn off into a filter 4, preferably of the step type having two or more masses of filtering material. The liquid from the filter is then passed into a second storage chamber 5, where it is held for the further steps of the process. From the storage chamber the liquid juice is withdrawn in small quantities into freezing cans which are placed in a freezing chamber 7 where the juice is frozen, and where it is stirred or agitated constantly during the freezing process so as to form the juice into a water ice or frozen foam.

From the freezing vessels, the resultant frozen foam is placed in the basket of a centrifuge 8 where the unfrozen liquid fruit juice is removed by centrifugal action, and this concentrate is passed into a suitable storage tank 9, from which it is passed into a heating tank 10 which is supplied with steam pipes or other heating coils 11 so as to heat and preferably simultaneously sterilize the liquid.

The heat coagulates the albuminous matter and forces the pectin into such form that the desirable juices may be filtered out. The hot concentrate from the heating tank is then passed into a second step filter 12, where it passes through two or more masses of filtering material which remove the pectin and some of the other matter in suspension. From the filter it is again passed into a storage tank 13 and then into a cooling chamber 14, where it is cooled down to a temperature just above the freezing point. When cooled to this temperature, the concentrated juice is next passed through a third filter 15 and is then passed to the final storage chamber 16 from which it is drawn off into bottles or other containers which are sterilized and then sealed and made ready for shipment.

Where the single freezing does not obtain the desired concentration or where the step concentration is found to be better, the liquid may be drawn from the hot filter 12 or its storage tank 13 into a second freezer 21, again or finally concentrated in the centrifuge 22 and passed into a cold storage tank 23. The concentrate is then cold filtered in the filter 24 and passed into the final storage tank 25.

In concentrating a fruit juice it has been found essential to first remove as much of the water content as practicable by a freezing method and a centrifuge, and then to heat the concentrate sufficiently to change the viscosity and character of the liquid to free the desired liquid from pectin and the like so that the desired concentrate will pass the filter. If the material is filtered before concentration, the pectin which is in solution will pass through the filter with the water, but when the juices are concentrated the pectin may be removed by filtration if the concentrate is heated. It is necessary to heat the concentrate to remove the pectin satisfactorily as the concentrate with the pectin when cold does not filter, as the pectin and the concentrated juice in the cold state tends to form a jelly-like mass which merely rests upon the filter medium.

In many instances it has been found desirable to limit the original concentration and then after the heating and filtering the resultant liquid is again frozen and concentrated to the desired point and is then cold filtered, bottled and sealed as previously described.

After the concentrate has been heated and filtered to remove the pectin, it has been found that upon re-cooling the concentrate it is cloudy. There seems to be a certain amount of matter which is thrown into suspension upon re-cooling the concentrate after it has been once heated and this suspended matter is filtered out of the concentrate after it has been finally cooled. The resultant concentrate after the filtering process has been completed is run into bottles or any suitable container and is then sterilized at a temperature below the boiling point and the bottles or containers may then be sealed up. It will be seen that in the present process, the juices are at no time heated to the boiling point, nor is any foreign substance such as sugar or preservative added, and the resultant concentrate is a perfectly clear liquid. Aromatic oils that are in the fruit and this liquid may be used either directly as a flavoring extract or diluted to form a soft drink, and when diluted, it seems to have the full flavor of the original fruit juices.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. The method of making concentrated fruit juice, consisting of pressing the fruit to extract the liquid juices, filtering the obtained liquid to remove the pulpy matter, concentrating the filtered liquid by freezing into a snow and removing the concentrated juices from the snow crystals by centrifugal action, heating such concentrated juice to a temperature below boiling, filtering such heated concentrate to remove pectin and other undesirable matter, cooling the filtered concentrate to a temperature just above the freezing point, and refiltering such cold concentrate to remove all suspended matter, and collecting such finally filtered concentrate.

2. The method of making concentrated fruit juice, consisting of pressing the fruit to extract the liquid juices, filtering the obtained liquid to remove the pulpy matter, concentrating the filtered liquid by freezing into a snow and removing the concentrated juices from the snow crystals by centrifugal action, heating such concentrated juice to a temperature below boiling, filtering such heated concentrate to remove pectin and other undesirable matter, cooling the filtered concentrate to a temperature just above the freezing point, refiltering such cold concentrate to remove all suspended matter, collecting such finally filtered concentrate, and bottling and sterilizing such final obtained concentrate.

3. The method of making concentrated fruit juice, consisting of pressing the fruit to extract the liquid juices, filtering the extracted juices to remove the pulpy matter, partially concentrating the juices by freezing and removal of ice crystals, filtering the resultant partially concentrated juice while at a substantially freezing temperature, concentrating to final concentrate by freezing into snow form and removing the crystals, heating such concentrate to a sterilizing temperature, filtering such hot concentrate, cooling such filtered concentrate to substantially the freezing point and filtering such cold concentrate.

4. The method of making concentrated fruit juice, consisting of pressing the fruit to extract the liquid juices, filtering the extracted juices to remove the pulpy matter, partially concentrating the juices by freezing and removal of ice crystals, filtering the resultant partially concentrated juice while at a substantially freezing temperature to remove all matter thrown into suspension by cooling and partial removal of water, concentrating to final concentrate by refreezing into snow and removing concentrate from the ice crystals by centrifugal action, filtering such final concentrate while cold to remove all suspended matter, heating such concentrate to sterilizing temperature and filtering such heated concentrate to remove matter coagulated or thrown into suspension by heat, cooling such filtered concentrate to substantially freezing temperature and refiltering the same to remove any matter thrown into suspension by the recooling after heating.

Signed by me this 23rd day of July, 1924.
WALTER M. ZORN.